United States Patent
Sinharoy

(10) Patent No.: US 11,756,115 B2
(45) Date of Patent: *Sep. 12, 2023

(54) SYSTEM FOR PROVIDING SCORES TO CUSTOMERS BASED ON FINANCIAL DATA

(71) Applicant: Bottomline Technologies, Inc., Portsmouth, NH (US)

(72) Inventor: Anirban Sinharoy, Mumbai (IN)

(73) Assignee: Bottomline Technologies, Inc., Portsmouth, NH (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/746,528

(22) Filed: May 17, 2022

(65) Prior Publication Data

US 2022/0277386 A1    Sep. 1, 2022

Related U.S. Application Data

(63) Continuation of application No. 16/917,161, filed on Jun. 30, 2020, now Pat. No. 11,386,487.

(30) Foreign Application Priority Data

Apr. 30, 2020    (IN) .............................. 202011018477

(51) Int. Cl.
   *G06Q 40/00*    (2023.01)
   *G06Q 40/02*    (2023.01)
   (Continued)

(52) U.S. Cl.
   CPC ......... *G06Q 40/02* (2013.01); *G06F 16/2379* (2019.01); *G06F 21/6254* (2013.01); *G06Q 40/12* (2013.12)

(58) Field of Classification Search
   CPC .................................................. G06Q 40/02
   See application file for complete search history.

(56) References Cited

U.S. PATENT DOCUMENTS 5,875,108 A    2/1999   Hoffberg
6,009,415 A *  12/1999  Shurling ............ G06Q 30/0226
                                                    705/35

(Continued)

FOREIGN PATENT DOCUMENTS

AU    2003288790 B2    2/2009
CN    106447434 A      2/2017

(Continued)

OTHER PUBLICATIONS

Growth customer information mining analysis with association rules in On-line financial Web site IEEE (Year: 2010).*

(Continued)

*Primary Examiner* — Bruce I Ebersman
(74) *Attorney, Agent, or Firm* — Richard A. Baker, Jr.

(57) ABSTRACT

Disclosed is a system for scoring customers of a financial institution based on financial data. The system includes a central database that stores a plurality of modules, a central server that processes the plurality of modules and a display unit that displays the processed plurality of modules. The plurality of modules includes a criteria configuration module, a data module, and a computation module. The criteria configuration module includes a metric module to receive the input parameters required to evaluate the score, and a measurement module for defining transformation criteria to be applied on the data corresponding to the input parameters. The computation module includes a metric evaluation module to compute and applies the transformation criteria to the values of the input parameters, and a scoring module coupled to the metric evaluation module to automatically compute and display the score of the customers based on the values retrieved from the metric evaluation module.

18 Claims, 9 Drawing Sheets

(51) Int. Cl.
*G06F 16/23* (2019.01)
*G06F 21/62* (2013.01)
*G06Q 40/12* (2023.01)

(56) References Cited

U.S. PATENT DOCUMENTS

| | | | |
|---|---|---|---|
| 6,400,996 | B1 | 6/2002 | Hoffberg |
| 6,424,951 | B1 | 7/2002 | Shurling et al. |
| 7,725,419 | B2 | 5/2010 | Lee |
| 8,429,103 | B1 | 4/2013 | Aradhye |
| 8,990,688 | B2 | 3/2015 | Lee |
| 9,405,427 | B2 | 8/2016 | Curtis |
| 11,386,487 | B2 * | 7/2022 | Sinharoy ............... G06Q 40/02 |
| 2002/0118223 | A1 | 8/2002 | Steichen |
| 2003/0144933 | A1 * | 7/2003 | Huang ................... G06Q 30/02 705/35 |
| 2006/0106695 | A1 | 5/2006 | Carlson et al. |
| 2009/0240647 | A1 | 9/2009 | Green |
| 2009/0248559 | A1 * | 10/2009 | Recce .................... G06Q 20/40 705/1.1 |
| 2010/0145857 | A1 * | 6/2010 | Davila ................. G07F 19/211 705/44 |
| 2011/0295722 | A1 * | 12/2011 | Reisman ............ G06Q 30/0641 705/26.1 |
| 2012/0084197 | A1 * | 4/2012 | Petralito ............... G06Q 40/03 705/38 |
| 2013/0151388 | A1 * | 6/2013 | Falkenborg ............ G06Q 40/02 705/35 |
| 2014/0201126 | A1 * | 7/2014 | Zadeh .................... A61B 5/165 706/52 |
| 2014/0317502 | A1 | 10/2014 | Brown |
| 2015/0332284 | A1 * | 11/2015 | Unser ................ G06Q 30/0201 705/7.29 |
| 2018/0349446 | A1 | 12/2018 | Triolo |
| 2020/0184278 | A1 * | 6/2020 | Zadeh ..................... G06N 3/044 |
| 2020/0203017 | A1 * | 6/2020 | Dower ................... G16H 50/20 |
| 2021/0256485 | A1 * | 8/2021 | Fidanza ............ G06Q 30/0201 |
| 2022/0101438 | A1 * | 3/2022 | Gao .................. G06Q 30/0201 |

FOREIGN PATENT DOCUMENTS

| | | |
|---|---|---|
| CN | 110766528 A | 2/2020 |
| IN | 201941043291 A1 | 10/2019 |

OTHER PUBLICATIONS

Large-scale Data-driven Segmentation of Banking Customers IEEE (Year: 2020).*

Intellectual Property India, "Examination report under sections 12 & 13 of the Patents Act, 1970 and the Patents Rules, 2003", Feb. 24, 2023.

* cited by examiner

204

| Parameters | Filters | Measurement | Weight |

302 — MEASURE AS* ⓘ
[ Condition ▾ ]

304 — WHEN SURPLUS BALANCE IS*    BALANCE*
[ Greater Than ▾ ]    [ $500,000 ]

Note: The output of a condition determines whether a customer is eligible for this criterion.

Cancel   (Save)

Criteria

| Parameters | Filters | Measurement | Weight |

NAME*
[Total Transaction Amount]

METRIC*
[Total Transaction Amount ⌄]

AGGREGATION LEVEL* — 208
[Account ⌄]
Account — 602
Customer — 604
[Edit List]

DURATION* — 205
[3] [Months ⌄]

Cancel (Save)

Parameters  Filters  Measurement  Weight

ADD FILTERS

| Account Filters | Customer Filters |
| Account Age | Customer Location |
| Account Closure Period | Customer Relationship Age |
| Product Category | Customer Segment |
| Product Group | |
| Sales Product | |
| Service Account | |

802

Product Category Filter
⊙Including ○Excluding

Checking ⊗                                    Cancel  Save

FIG. 8

SYSTEM FOR PROVIDING SCORES TO CUSTOMERS BASED ON FINANCIAL DATA

PRIOR APPLICATIONS

This document is a continuation of U.S. patent application Ser. No. 16/917,161, filed by Anirban Sinharoy on Jun. 30, 2020, entitled "A System for Providing Scores to Customers Based on Financial Data", said application incorporated herein by reference. U.S. patent application Ser. No. 16/917, 161 is based on, and claims priority to, Indian patent application 202011018477, filed on Apr. 30, 2020, entitled "A System for Providing Scores to Customers Based on Financial Data" by Anirban Sinharoy, said application included herein by reference.

BACKGROUND OF THE INVENTIONS

1. Field of the Inventions

The present inventions generally relate to a rating system, and more particularly relates to a system for providing scores to customers based on financial data.

2. Description of Related Art

Banking is similar to other businesses, in that there is competition over customers, and each bank needs to evaluate the portfolio of customers. There is a recognized need in the financial services industry to attract and retain loyal customers. A loyal customer is one who establishes all or a significant number of his relationships with a single Bank and does so over an extended period of time. Herein incorporated for reference is U.S. patent Ser. No. 16/723, 048, filed on Dec. 20, 2019, entitled "Using Inferred Attributes as an Insight into Banking Customer Behavior" by Anirban, Sinharoy.

Customers expect bankers to understand their relationship with the bank and want their primary banker to proactively offer relevant insights and solutions for their business. Banks that deliver intelligent, insightful experiences can expect customers to reward them with significantly higher intent to purchase additional products and services.

Business owners are much more likely to refer another company to a bank that delivers timely, intelligent recommendations. Bankers that understand their customers' businesses and provide tailored solutions lead far more often to exclusive primary bank relationships. Incentive programs for rewarding repeat or ongoing customers have become increasingly common in a variety of industries.

There exists a great deal of variation among banks in the types of financial services offered and emphasized. In particular, different banks may wish to establish different scoring systems for the various types of relationships, depending on which relationships they find to be most profitable.

Further, each bank may wish to establish a different award structure of incentives or more personalized products, depending upon that bank's perception of the benefits of the program in relation to the costs of the incentives and to the needs of its particular customer. Every bank has their own home grown rating system which is driven from in-house data and computed by in-house data analysts based on the banker's experience.

There is always an increased risk of incorrect rule codification, incorrect data collation, and incorrect calculations resulting from human dependence and bias. Maintaining a manual relationship score card on each Bank customer duplicates much of the data available in the computer data bases maintained by most modern Banks. Therefore, there is a need of a system for the computing scores of customers based on financial data. Further, the system should collate data automatically, apply the rules in uniform un-biased manner to compute the scores automatically.

SUMMARY OF THE INVENTIONS

In accordance with teachings of the present inventions, a system for providing scores to customers based on financial data.

An object of the present inventions is to provide the system with a central database, a central server, and a display unit. The central database stores plurality of modules and the central server processes the plurality of modules. The modules include a criteria configuration module, a data module, and a computation module.

The criteria configuration module includes a metric module to receive the input parameters required to evaluate the score, and a measurement module for defining transformation criteria to be applied on the data corresponding to the input parameters. The data module is coupled with the central database to receive the customer financial and personal data.

The computation module is coupled to the data module and the criteria configuration module to compute the score for each customer using the input parameters. The computation module includes a metric evaluation module to compute and applies the transformation criteria to the values of the input parameters, and a scoring module coupled to the metric evaluation module to automatically compute and display the score of the customers based on the values retrieved from the metric evaluation module.

The metric evaluation module includes a balance module to extract the various amount values against various balance heads in account of each customer, a portfolio module to extract value of portfolio size of various types of accounts of each customer, and a transaction module to extract the various financial transaction values made by each customer.

Another object of the present inventions is to provide the plurality of modules with a threshold module for allowing a user to set a score threshold value. Further, the scoring module computes score based on the aggregation of the values obtained from the metric evaluation module.

Another object of the present inventions is to provide the metric evaluation module with a service usage module to compute average service usage fees, a total service usage counts and a total service usage fees over a user-defined time period of each customer. Further, the criteria configuration module includes a filter module for allowing the user to select at least one filter to create a sub-section of a customer population.

Another object of the present inventions is to provide the computation module with a filtration module coupled to the metric evaluation module for computing the input parameters only for the selected sub-section of the customer population. The data module further generates a unique identifier for each customer, and further anonymizes the customer financial and personal data before communicating to the computation module.

Another object of the present inventions is to provide the criteria configuration module with an aggregation level module for allowing the user to select either an account level or a customer level, to roll up the values as defined by the metric evaluation module, and a duration module for allowing the user to define the time period for evaluating values of the metric evaluation module.

Another object of the present inventions is to provide the plurality of modules with a score captioning module to define and label multiple ranges of scores, wherein the computation Zo module labels the score as per the range. Further, the criteria configuration module includes a weightage configuration module coupled to the measurement module to evaluate score by applying weightage to each input parameter.

BRIEF DESCRIPTION OF DRAWINGS

The annexed drawings, which are not necessarily to scale, show various aspects of the inventions in which similar reference numerals are used to indicate the same or similar parts in the various views.

FIG. 3 is a screenshot showing a measurement module in accordance with an embodiment of the present inventions;

FIG. 6 illustrates a screenshot viewing of the criteria configuration module showing an aggregation level module;

FIG. 8 illustrates a screenshot showing a filter module in accordance with an embodiment of the present inventions.

DETAILED DESCRIPTION OF DRAWINGS

Figure 1:
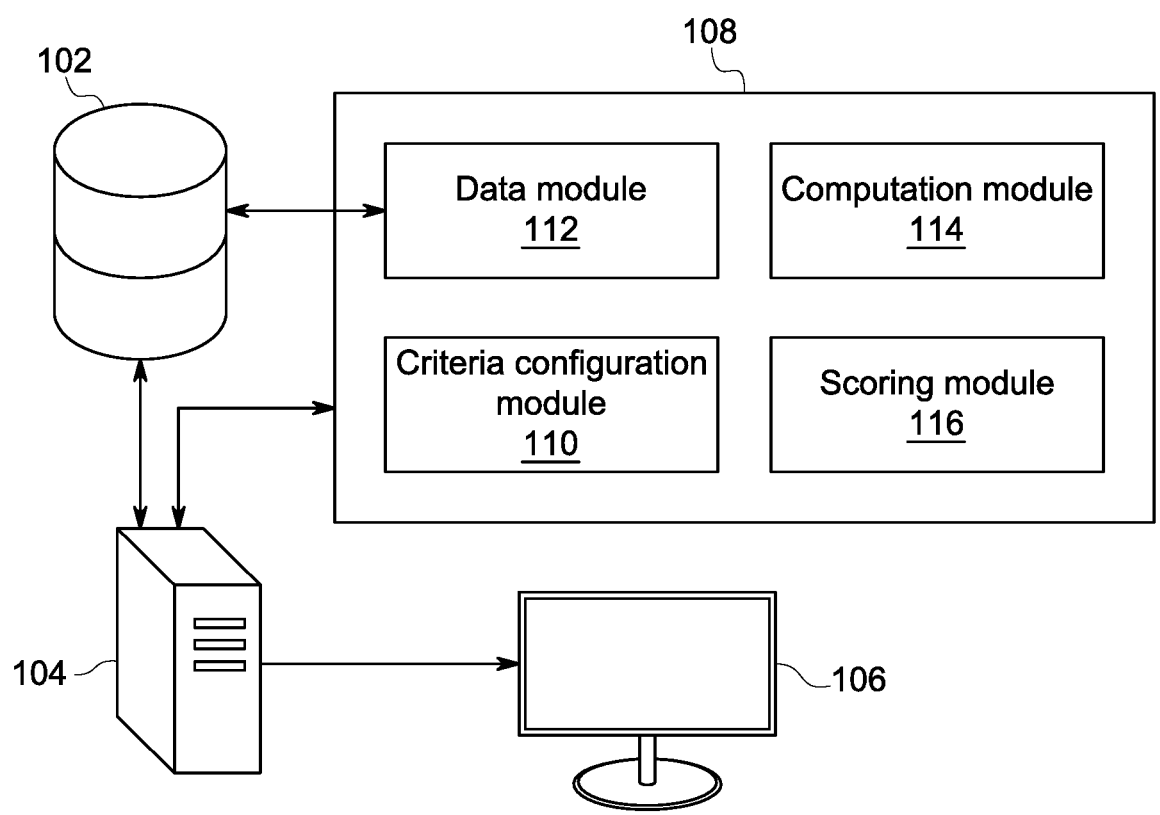
FIG. 1 illustrates a block diagram of a system for providing scores to customers based on financial data.

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present inventions relate to a system for computing scores for the customers based on their professional relationship with the bank using software. The system stores the data, and computes the score based on specific criteria. The criteria would be based on the various amount values in accounts, portfolio size, transaction values etc. of each customer.

FIG. 1 illustrates a block diagram of a system 100 for providing scores to customers based on financial data. The system 100 includes a central database 102, a central server 104, and a display unit 106. The central database 102 stores a plurality of modules 108. The plurality of modules 108 include a criteria configuration module 110, a data module 112, a computation module 114, and a scoring module 116.

Examples of the central database 102 include but not limited to a centralized database, a distributed database, a homogenous database, a personal computer database, a client database and a heterogeneous database. The central database 102 is a high performance, high capacity database to handle the volume of information required.

The central server 104 is coupled to the central database 102 for processing the plurality of modules 108. Examples of the central server 104 include but are not limited to a proxy server, web server, application server, cloud server, real-time communication server, microprocessors, super computers etc. The central server 104 is a highly performant processing unit.

The display unit 106 displays the processed plurality of modules 108. Examples of the display unit 106 include but not limited to LED, LCD, OLED, a mobile device display or a smart computer display, or a display on a personal computing device. It would be readily apparent to those skilled in the art that various types of display unit 106, the central database 102 and the central server 104 may be envisioned without deviating from the scope of the present inventions.

The data module 112 is coupled with the central database 102 to receive the customer financial and personal data. Examples of the financial data includes but is not limited to the number of accounts in the bank, account balances, account currencies, features of the accounts (debit cards, overdraft protection, etc.) etc.

Examples of the personal data includes but is not limited to a name, an address, a city, customer segment, industry segment, and other related demographics and firmographics etc. In another embodiment, the data module 112 generates a unique identifier for each customer, and further anonymizes the customer financial and personal data before communicating to the computation module 114. The criteria configuration module 110 is explained in detail in conjunction with FIG. 2 and FIG. 3 of the present inventions. The computation module 114 is explained in detail in conjunction with FIG. 4 of the present inventions.

Figure 2:
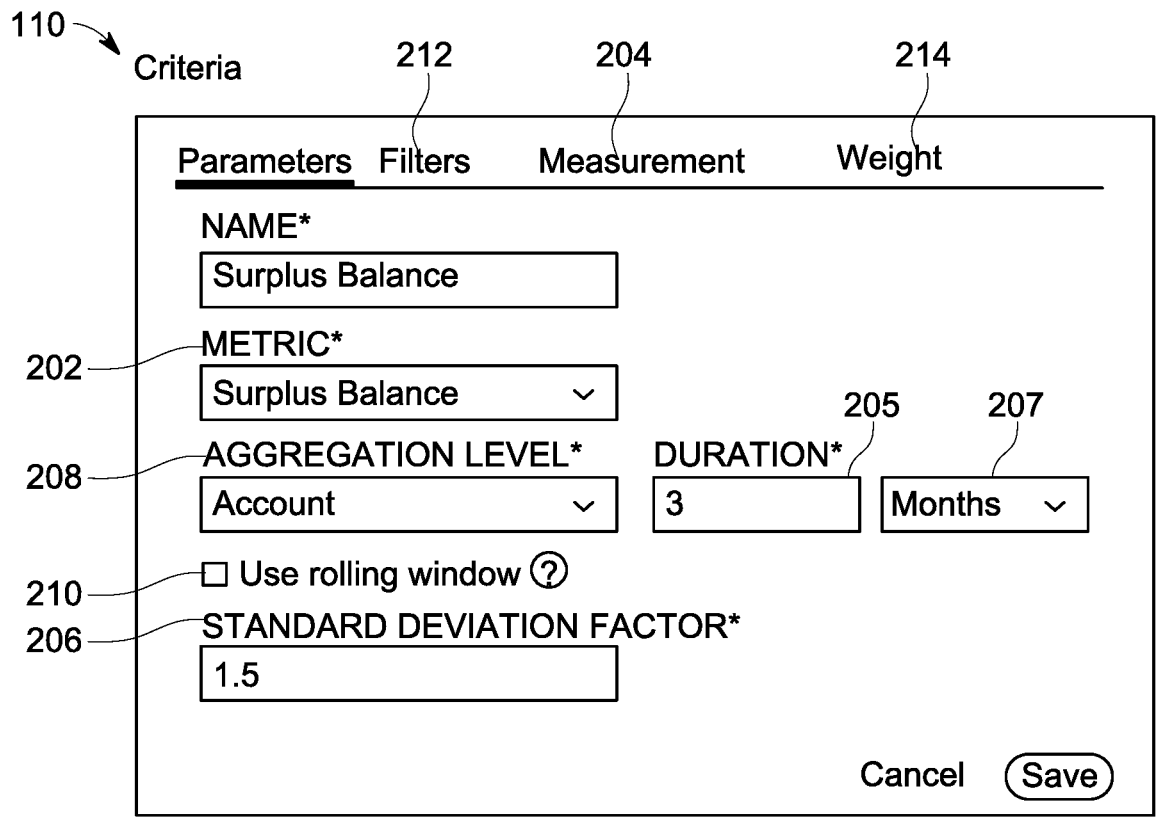
FIG. 2 illustrates a screenshot showing a criteria configuration module in accordance with an embodiment of the present inventions.

FIG. 2 illustrates a screenshot showing the criteria configuration module 110 in accordance with an embodiment of the present inventions. The criteria configuration module 110 configures input parameters for scoring the customer. The criteria configuration module 110 includes a metric module 202 and a measurement module 204.

The metric module 202 receives input parameters required to evaluate the score. The measurement module 204 defines transformation criteria to be applied to the data corresponding to the input parameters. In an embodiment of the present inventions, the metric module 202 receives input parameters to evaluate the score over a pre-defined time period for each customer.

In another embodiment of the present inventions, the criteria configuration module 110 includes a duration module 205 for allowing the user to define the time period for evaluating values. The pre-defined time period is shown as Duration 205 and unit of time 207. For exemplary purposes, the Duration 205 is 3 and the unit of time 207 is months. It would be readily apparent to those skilled in the art that various Duration 205 and unit of Time 207 may be envisioned without deviating from the scope of the present inventions.

The Duration Period 205 defines the observation period from where the data will be collated and aggregated. The observation period may either be recent entire months defined in duration or may be a rolling window module 210 extending up to the duration ending the previous day. The rolling window module 210 keeps moving ahead by a day, and as time proceeds the observation period keeps changing. The metric module 202 and the input parameters are explained in detail in conjunction with FIG. 5 of the inventions.

In another embodiment of the present inventions, the criteria configuration module 110 includes a standard deviation module 206 is used specifically for computing surplus balance metric only. For exemplary purposes, the computation may be done by keeping standard deviating factor as 1.5.

Further, the surplus balance is calculated as follows:

Current Monthly Balance−(Avg. Monthly Balance over duration−Std. Dev Factor×Std Dev for same duration)

In another embodiment of the present inventions, the criteria configuration module 110 includes an aggregation level module 208 for allowing the user to select either an account level or a customer level, to roll up the values. The aggregation level module 208 is explained in detail in conjunction with FIG. 6 of the present inventions.

In another embodiment of the present inventions, the criteria configuration module 110 includes a filter module 212 allows the user to select at least one filter to create a sub-section of the customer population. The filter module 212 is explained in detail in conjunction with FIG. 8 of the present inventions.

In another embodiment of the present inventions, the criteria configuration module 110 includes a weightage configuration module 214 coupled to the measurement module 204 to evaluate score by applying weightage to each input parameter. The weightage configuration module is explained in detail in conjunction with FIG. 9 of the present inventions.

FIG. 3 is a screenshot showing the measurement module 204 in accordance with an embodiment of the present inventions. The measurement module 204 defines transformation criteria (hereinafter referred as MEASURE AS 304) to be applied to the data corresponding to the input parameters. For exemplary purposes as shown in FIG. 3, the WHEN SURPLUS BALANCE IS 302 Greater Than $500,000 then MEASURE AS 304 Condition. Further, examples of the MEASURE AS 304 include but not limited to Raw Value, Custom Bins, Scaled Value etc.

Transformation Criteria—Condition—Applies a truth rule on the metric value whose outcome is 1 when the condition is satisfied and the outcome is 0, when the condition is not satisfied. So, if the condition of having a balance of more than $50,000 is achieved then the condition is fulfilled.

Further, examples of the WHEN SURPLUS BALANCE IS 302 include but not limited to Greater Than or Equals, Equals, Less Than, Less Than or Equals etc. It would be readily apparent to those skilled in the art that various transformation criteria may be envisioned to be applied to the input parameters without deviating from the scope of the present inventions.

Figure 4:
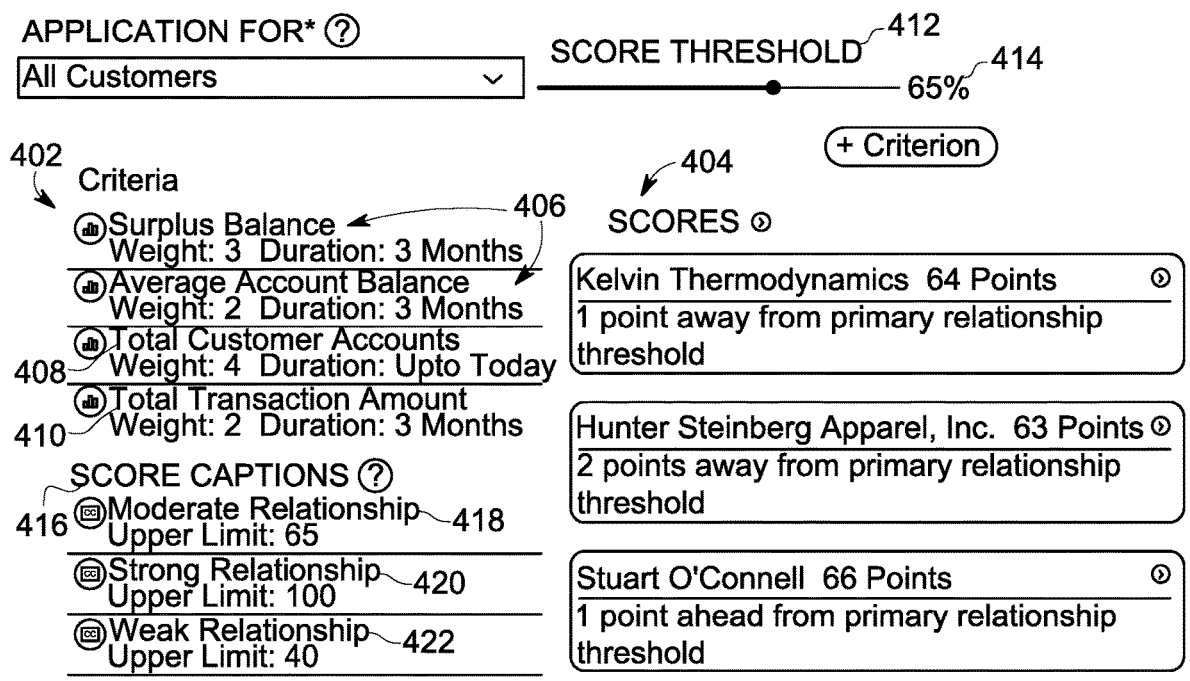
FIG. 4 illustrates a screenshot of the criteria configuration module, and a scoring module after the evaluation computed by a computation module in accordance with an embodiment of the present inventions.

FIG. 4 illustrates a screenshot of the criteria configuration module 110 and a scoring module 404 after the evaluation computed by the computation module (it's a background computation module, so it cannot be displayed) in accordance with an exemplary embodiment of the present inventions. The computation module is coupled to the data module (112, shown in FIG. 1) to compute the score for each customer using the input parameters defined in the metric module (202, shown in FIG. 2).

The computation module includes a metric evaluation module (it's a background computation module, so it cannot be displayed) and a scoring module 404. The metric evaluation module computes and applies the transformation criteria to the values of the input parameters provided in the criteria configuration module 110. The metric evaluation module includes a balance module evaluated from each financial account 406 of each customer, a portfolio module evaluated from the portfolio 408 held by each customer, and a transaction module evaluated from the financial transactions 410 of each customer.

The balance module 406 extracts the various amount values against various balance heads in the account of each customer. An example of the balance heads includes but not limited to an available balance, an outstanding balance, a loan balance, a credit amount etc. The balance module 406 computes an average balance, a projected balance and a total balance over a user-defined time period of each customer.

The portfolio module 408 extracts the value of the portfolio size of various types of accounts of each customer. The portfolio includes but not limited to checking accounts, saving accounts, mortgage accounts, line of credits, investment accounts, credit cards, service accounts etc.

The transaction module 410 extracts the various financial transaction values made by each customer. The financial transaction values include but not limited to the total transaction amount. The transaction module 410 computes an average transaction amount, a total transaction amount, and an average transaction count over a user-defined period of each customer.

The scoring module 404 is coupled to the metric evaluation module to automatically compute and display the score of the customers based on the values retrieved from the metric evaluation module. In another embodiment of the present inventions, the scoring module 404 computes the score based on the aggregation of the values obtained from the metric evaluation module.

In an exemplary embodiment, the scores 404 for Kelvin Thermodynamics is 64 Points, Hunter Steinberg Apparel, Inc. is 63 Points and Stuart O'Connell is 66 Points. The scoring module 404 is explained in detail in conjunction with FIG. 7 of the present inventions. In an embodiment of the present inventions, the score is calculated using the following formulae:

$$S = \Sigma_{(1,n)} w_i F(m_i)$$

Where, F is the measurement function, w is the weightage, S is the overall score $$m_i = f(x_i)$$

Where, f is the aggregation based function, m is the computed metric value $$x_i \varepsilon A \cap B \cap C$$

Where, A, B, C are filtered subsets, and x belongs to the set of observations

In another embodiment of the present inventions, the plurality of modules further includes a threshold module 412 for allowing a user to set a score threshold value 414. The threshold module 412 indicates the health of the score as a Boolean. In an embodiment of the present inventions, a score threshold value 414 is 65%.

In another embodiment of the present inventions, the criteria configuration module 110 includes a filtration module is coupled to the metric evaluation module for computing the input parameters only for the selected the sub-section by applying the filters defined in the filter module (212, as shown in FIG. 2) of the customer population.

In another embodiment of the present inventions, the plurality of modules (108, shown in FIG. 1) includes a score captioning module 416 to define and label multiple ranges of scores, wherein the computation module labels the score as per the range. The score captioning module 416 allows the user to fit the score into at least one of the ranges and apply the defined label to the score to define the relationship of each client with the bank.

Examples of the score captioning 416 includes but not limited to a Moderate Relationship 418 where the upper limit is 65, a Strong Relationship 420 where the upper limit is 100, and a Weak Relationship 422 where the upper limit is 40.

Figure 5:
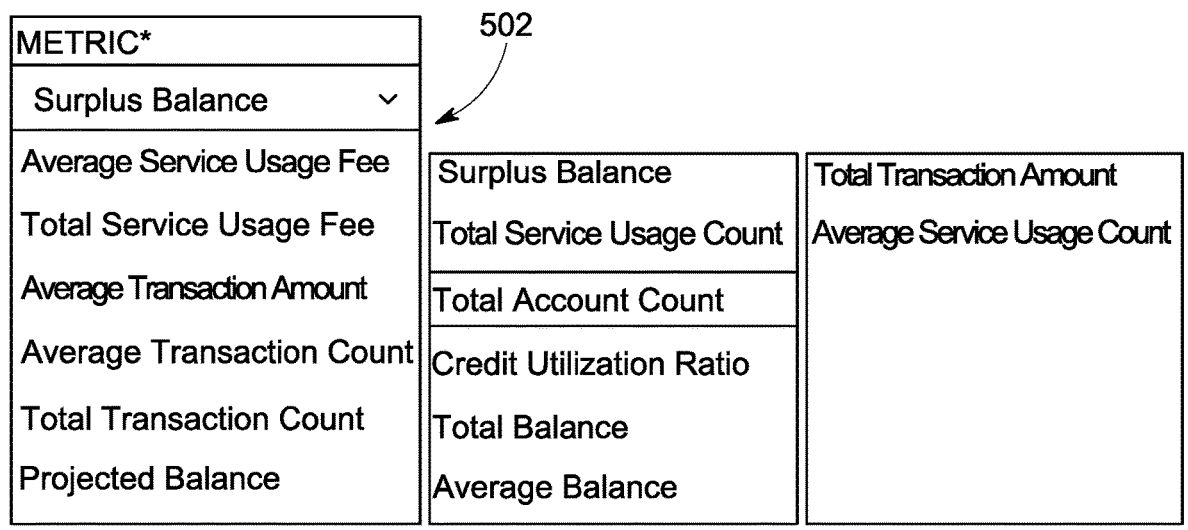
FIG. 5 illustrates a screenshot showing list of various input parameters required to evaluate the score by a metric evaluation module.

FIG. 5 illustrates a screenshot showing list of various input parameters 502 required to evaluate the score by the metric evaluation module. Examples of the input parameters 502 include the average service usage fee, the total service usage fee, the average transaction amount, the average transaction account, the total transaction amount, the total transaction count, the projected balance, the total account count, the credit utilization ratio, the total balance, the average balance etc.

The metric evaluation module further includes a service usage module to compute average service usage fees, total service usage counts and total service usage fees over a user-defined time period of each customer.

FIG. 6 illustrates a screenshot viewing of the criteria configuration module 110 showing the aggregation level module 208. As shown, the aggregation level module 208 allows the user to select at least either account 602 or customer 604 level to perform the aggregation. The input parameters may be rolled up for the duration 205 at the account level 602 or the customer level 604 to derive the statistical value.

Figure 7:
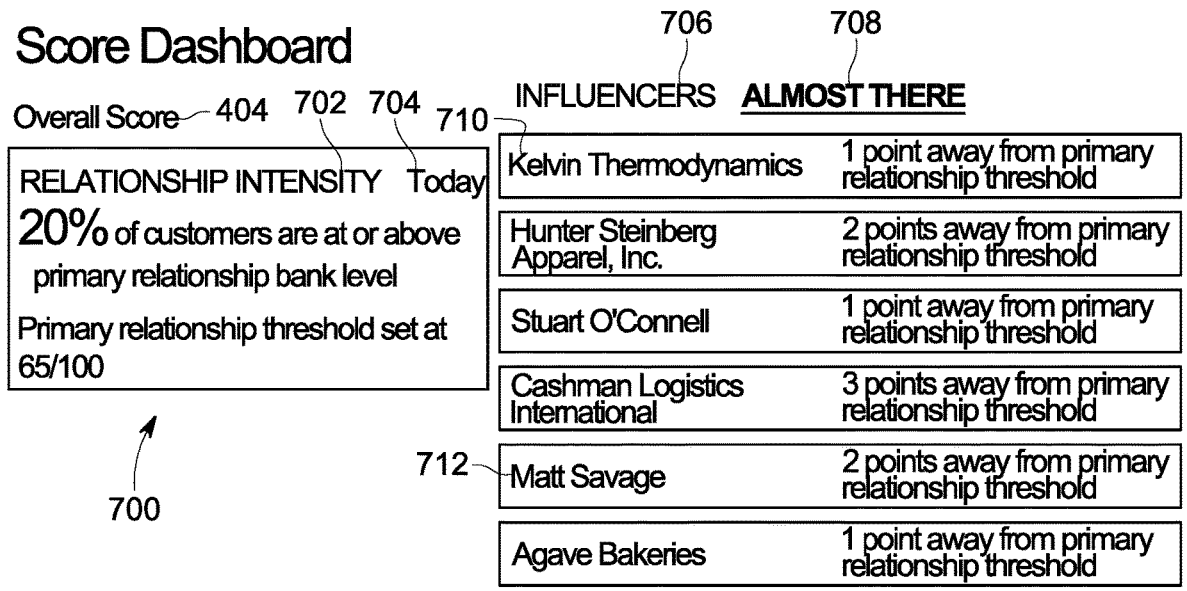
FIG. 7 illustrates a screenshot showing of a dashboard of the scoring module in accordance with an embodiment of the present inventions.

FIG. 7 illustrates a screenshot showing a dashboard 700 of the scoring module 404 in accordance with an embodiment of the present inventions. The dashboard 700 shows the relationship intensity 702 as computed on date 704 based on the scoring module 404.

For exemplary purposes, the relationship intensity 702 is 20% of customers are at or above the primary relationship bank level. Herein the primary relationship threshold value is 65/100. The threshold value (412, as shown in FIG. 4) is set through the threshold module (414, as shown in FIG. 4). It would be readily apparent to those skilled in the art that a different threshold value may be envisioned without deviating from the scope of the present inventions.

The dashboard 700 further displays top INFLUENCERS 706 customers and ALMOST THERE 708 customers. The top influencers 706 customers are those who have exceeded the threshold value. The almost there 708 customers are those who are about to reach the threshold value. For exemplary purposes, Kelvin Thermodynamics 710 is one point away from the primary relationship threshold value, Matt Savage 712 is two points away from the primary relationship threshold value.

FIG. 8 illustrates a screenshot showing the filter module 212 in accordance with an embodiment of the present inventions. The filter module 212 allows the user to select at least one filter 802. Examples of the filters 802 include but not limited to filters 802 based on the account filters and the customer filters. Examples of the account filters include but not limited to Account Age, Account Closure, Period, Product Category, Product Group, Sales Product, Service Account etc.

Examples of customer filters include but not limited to customer location, customer relationship age, customer segment etc. It would be readily apparent to those skilled in the art that various types of filters 802 may be envisioned without deviating from the scope of the present inventions.

In another embodiment of the present inventions, filters may be used as whitelist or blacklist. Further, the filters applied may evaluate to true for an observation to be included.

The filters 802 create a sub-section of a customer population. With reference to FIG. 4, the filtration module is coupled to the metric evaluation module for computing the input parameters only for the selected the sub-section of the customer population.

Figure 9:
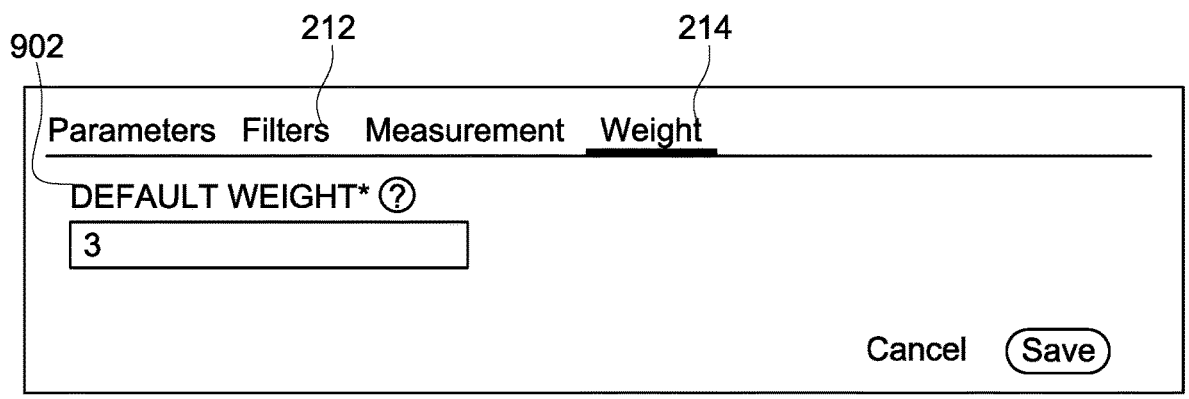
FIG. 9 illustrates a screenshot showing a weightage configuration module in accordance with an embodiment of the present inventions.

FIG. 9 illustrates a screenshot showing the weightage configuration module 214 in accordance with an embodiment of the present inventions. The weightage configuration module 212 is coupled to the measurement module 204 to evaluate the score by applying weightage to each input parameter.

For exemplary purposes as shown in FIG. 9, a default weight 902 is 3. The weight is indicative of the relative importance of the criterion amongst all the criteria. Those who skilled in the art will envision a different number of weight as per their requirements without deviating from the scope of the present inventions. The scoring module (404, as shown in FIG. 4) computes the score based on the aggregation of the weighted values obtained from the metric evaluation module.

It should be appreciated that many of the elements discussed in this specification may be implemented in a hardware circuit(s), a circuitry executing software code or instructions which are encoded within computer readable media accessible to the circuitry, or a combination of a hardware circuit(s) and a circuitry or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer readable media, or a combination of a hardware circuit(s) and a circuitry and/or control block executing such code. In some embodiments, the present inventions are delivered through non-transitory, computer-readable medium.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above describe elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The invention claimed is:

1. A system for evaluating customer's relationship with a financial institution based on customer's financial data for incentivizing a customer, the system comprising:
 a central database for storing a plurality of modules;
 a central server coupled to the central database for processing the plurality of modules; and
 a display unit to display the processed plurality of modules, wherein the plurality of modules comprises:
  a criteria configuration module to configure input parameters for evaluating the customer, the criteria configuration module comprising:
   a metric module to receive values related to the input parameters required to evaluate the customer's relationship over a duration;
   a duration module for defining the duration for evaluating the customer's relationship with the financial institution;
   a measurement module defines transformation criteria to be applied on the values corresponding to the input parameters; and
   a weightage configuration module is coupled to the measurement module to evaluate a score by applying weightage to each input parameter;
  a data module coupled with the central database to receive the customer financial data and personal data;
  a computation module coupled to the data module and the criteria configuration module to compute the score for each customer using the input parameters defined in the metric module, the computation module comprising:
   a metric evaluation module to compute and apply the transformation criteria to the values of the input parameters, the metric evaluation module comprising:
    a balance module to extract amount values against balance heads in an account of each customer, further the balance module computes aggregates of the balance heads using the extracted amount values; and
    a service usage module to compute average service usage fees, a total service usage counts and a total service usage fees over a user-defined time period of each customer;
   an aggregation level module for allowing a user to select at least one of: an account level; and a customer level, to roll up the values as defined by the metric evaluation module;
   a rolling window module for configuring the duration that ends on a previous day of evaluation; and
   a scoring module coupled to the metric evaluation module to automatically compute and display the score of the customers based on an aggregation the values retrieved from the metric evaluation module;
 wherein the score assists the financial institution to provide tailored incentivized programs to the customer.

2. The system according to claim 1, wherein the plurality of modules further comprising a threshold module for allowing a user to set a score threshold value.

3. The system according to claim 1, wherein the plurality of modules further comprising a transaction module to extract financial transaction values made by each customer, further the transaction module computes aggregates of a count of transactions using the extracted financial transaction values.

4. The system according to claim 1, wherein the balance module computes an average balance, a projected balance and a total balance over the user-defined time period of each customer.

5. The system according to claim 3, wherein the transaction module computes an average transaction amount, a total transaction amount and an average transaction count over a time period defined by a user of each customer.

6. The system according to claim 1 wherein the criteria configuration module further comprising a filter module allows a user to select at least one filter to create a selected sub-section of a customer population.

7. The system according to claim 6, wherein the computation module further comprising a filtration module coupled to the metric evaluation module for computing the input parameters only for the selected sub-section of the customer population.

8. The system according to claim 1 wherein the data module further generates a unique identifier for each customer, and further anonymizes the customer financial data and the personal data before communicating to the computation module.

9. The system according to claim 1, wherein the plurality of modules further comprising a score captioning module to define and label multiple ranges of the scores, wherein the computation module labels the score as per the range.

10. The system according to claim 1, wherein the metric evaluation module further comprising a portfolio module to extract values of portfolio size of types of accounts of each customer.

11. The system according to claim 1, wherein the scoring module computes the score based on an aggregation of weighted values obtained from the metric evaluation module.

12. The system according to claim 9 wherein the score captioning module allows a user to fit the score into at least one of the ranges and apply the defined label to the score to define a relationship of each client with a bank.

13. A non-transitory, computer-readable medium storing plurality of modules executable by a computer system to perform operations comprising:
 storing the plurality of modules using a central database;
 processing the plurality of modules using a central server; and
 displaying a processed plurality of modules, wherein the plurality of modules comprising:
  a criteria configuration module to configure input parameters for scoring a customer, the criteria configuration module comprising:
   a metric module to receive values related to the input parameters required to evaluate the score;
   a duration module for defining the duration for evaluating a relationship of the customer with a financial institution;

a measurement module defines transformation criteria to be applied on the values corresponding to the input parameters; and
a weightage configuration module is coupled to the measurement module to evaluate the score by applying weightage to each input parameter;
a data module to receive customer financial data and personal data;
a computation module coupled to the data module and the criteria configuration module to compute the score for each customer using the input parameters defined in the metric module, the computation module comprising:
a metric evaluation module to compute values of the input parameters, the metric evaluation module comprising:
a balance module to extract various amount values against various balance heads in an account of each customer; and
a service usage module to compute average service usage fees, a total service usage counts and a total service usage fees over a user-defined time period of each customer; and
an aggregation level module for allowing a user to select at least one of:
an account level; and a customer level, to roll up the values as defined by the metric evaluation module;
a rolling window module for configuring the duration that ends on a previous day of evaluation; and
a scoring module coupled to the metric evaluation module to automatically compute the score of the customers based on an aggregation the values retrieved from the metric evaluation module;
wherein the score assists a financial institution to provide tailored incentivized programs to the customer.

14. The non-transitory, computer-readable medium of claim 13 wherein the scoring module computes the score based on an aggregation of the values of obtained from the metric evaluation module.

15. The non-transitory, computer-readable medium of claim 13 wherein the criteria configuration module further comprising:
an aggregation level module for allowing a user to select an input to apply the transformation criteria as defined by the measurement module; and
a rolling window module for configuring the duration that ends on a previous day of evaluation.

16. The non-transitory, computer-readable medium of claim 13 wherein the plurality of modules further comprising a score captioning module to define and label multiple ranges of the scores, wherein the computation module labels the score as per the range.

17. The non-transitory, computer-readable medium of claim 13 wherein the plurality of modules further comprising a filter module allows a user to select at least one filter to create a sub-section of a customer population.

18. The non-transitory, computer-readable medium of claim 13 wherein the metric evaluation module further comprising:
a transaction module to extract financial transaction values made by each customer, further the transaction module computes aggregates of a count of transactions using the extracted financial transaction values; and
a portfolio module to extract values of portfolio size of types of accounts of each customer.

* * * * *